Patented Nov. 22, 1938

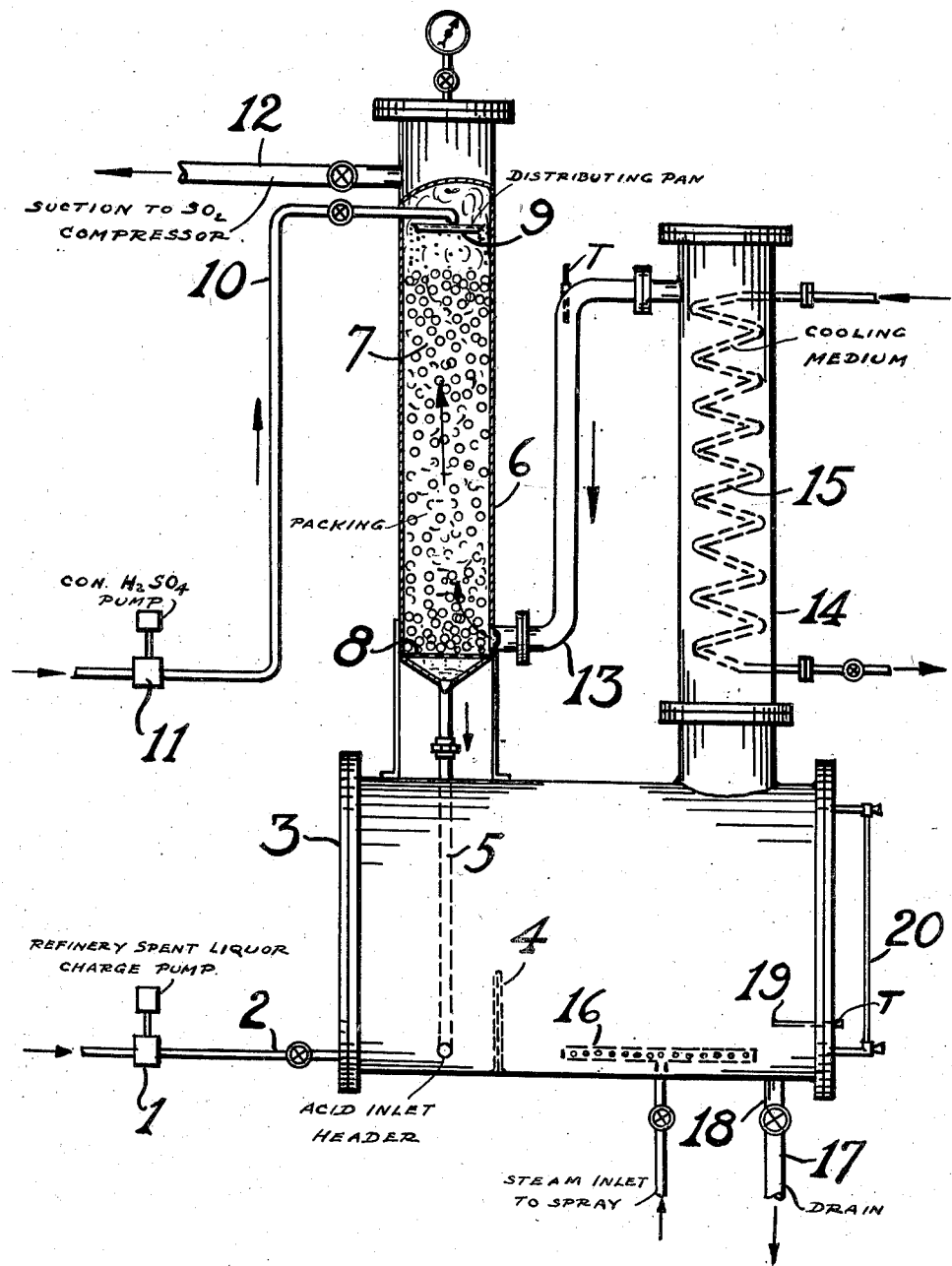

2,137,311

UNITED STATES PATENT OFFICE 2,137,311

PROCESS AND APPARATUS FOR THE RECOVERY OF SULPHUR DIOXIDE FROM SULPHITE LIQUORS

Karl L. Springer, Goose Creek, Tex., assignor to Standard Oil Development Company, a corporation of Delaware Application March 26, 1936, Serial No. 71,057

3 Claims. (Cl. 23—178)

The present invention is directed to a method and apparatus for the recovery of sulphur dioxide from sulphite liquors, particularly those which are obtained as waste by-products in the petroleum industry, although the invention also possesses exceptional utility for other commonly known waste sulphite liquors, such as the sulphite cellulose liquor of the paper industry.

Specific sulphite waste liquors of the petroleum industry, contemplated as suitable materials for treatment according to the present invention, are those obtained by washing petroleum hydrocarbons containing sulphur dioxide with caustic soda, and the liquor containing sodium thiosulphate formed by oxidizing with air the sodium salt obtained by washing petroleum hydrocarbons containing hydrogen sulphide with caustic soda.

Sulphite liquors are, in general, objectionable by-products of any industry in which they are formed. Particularly in the petroleum industry these liquors create a difficult disposal problem. Sulphur dioxide, on the other hand, is a highly useful agent in the refinement of petroleum oils and, according to a recent development which forms no part of the present invention, in the processing of light paraffinic hydrocarbons for the production of suitable starting materials for the synthesis of gasoline polymers. It is therefore extremely advantageous to provide a simple inexpensive process for the recovery of sulphur dioxide from sulphite liquors.

It is already known that sulphites can be decomposed by concentrated sulphuric acid with the evolution of sulphur dioxide. It is also known that, for use as a selective solvent, it is preferable to employ substantially anhydrous sulphur dioxide.

The particular object of the present invention is the provision of a simple method for the recovery of sulphur dioxide from sulphite liquor in a substantially anhydrous condition by the judicious employment of concentrated sulphuric acid, and a compact, relatively inexpensive apparatus for carrying out this process.

The principal element of novelty, according to the present invention, resides in the use of the same sulphuric acid as a drying medium for the sulphur dioxide produced and for the generation of the sulphur dioxide from the sulphite liquor. Specifically, the sulphuric acid to be employed for decomposition of the sulphite liquor is fed to the reaction chamber, containing the sulphite liquor, through a packed tower countercurrent to the sulphur dioxide evolved from the reaction chamber, preferably after the bulk of the water has been removed from the sulphur dioxide by condensation, since, in the absence of this expedient, the sulphuric acid might be diluted to a degree sufficient to render it unsuitable for the decomposition of the sulphite liquor.

The nature and objects of the present invention will be more readily understood by reference to the accompanying drawing in which is illustrated, in diagrammatic form, a front elevation, partly in section, of the apparatus preferred according to the present invention.

Referring to the drawing in detail, sulphite liquor is forced by pump 1 through line 2 into a retort 3 near the bottom thereof. Spaced from the point of admission of the sulphite liquor into retort 3 is an upwardly extending baffle 4. Extending downwardly from the top of the retort is an inlet pipe 5 for sulphuric acid, having its outlet end disposed between the baffle plate and the wall of the retort 3 in such a manner as to cause the introduced sulphuric acid to mix intimately with the introduced sulphite liquor.

The pipe 5 constitutes an outlet for scrubbing tower 6 which is packed with suitable contact material such as glass balls or porcelain rings 7 supported by a perforated plate 8.

Mounted above the contact material 7 in tower 6 is a distributing pan 9 onto which is fed concentrated sulphuric acid forced into the tower through line 10 by pump 11. Adjacent the bottom of tower 6 is an inlet 13 for sulphur dioxide which, upon being evolved from reaction chamber 3, passes through a cooling tower 14, cooled by a water coil 15, and connected with conduit 13 adjacent its top.

Arranged along the bottom of generator 3 is a steam spray head 16, the purpose of the steam being to facilitate the removal of the sulphur dioxide generated in chamber 3. Chamber 3 is also provided with outlet 17 controlled by a valve 18, with a thermocouple 19 and a level gauge of conventional type 20.

The method of working, according to the present invention, is believed to be apparent from the above description of the drawing. Briefly, however, waste sulphite liquor is introduced into retort 3 through pipe 2. Simultaneously, sulphuric acid of suitable strength, such as between 75 and 90%, is introduced into retort 3 through pipe 5. By reason of the position of baffle 4 and the velocity of flow of the incoming materials, strong turbulence is set up in the zone between the baffle 4 and the end wall of retort 3, whereby the sulphuric acid and the sulphite liquor are intimately mixed. The mixture of reaction material overflows baffle 4 into the main reaction zone in retort 3 which is maintained at a temperature between 180° F. and 200° F. The sulphur dioxide generated is steam stripped from the reaction mixture and passed through tower 14 in which the bulk of the contained water is condensed by the water coil 15. The sulphur dioxide then passes through conduit 13 into the bottom of tower 6 in which it is contacted with concentrated sulphuric acid, about 95%, which overflows from the distributing pan 9 and passes downwardly through tower 6. The sulphur dioxide leaving through outlet 12 is substantially anhydrous and may be fed directly to a compressor in which it is liquefied for use in the solvent extraction of oil.

As is apparent, the above unit for the recovery of sulphur dioxide from petroleum sulphite liquor may be employed as a direct adjunct to an $SO_2$ extraction plant, the liquor fed into retort 3 being that obtained by washing the raffinate and extract of an Edeleanu unit with caustic soda.

Various modifications may be made in the above described procedure and apparatus without departing from the scope of the invention. For example, baffle 4 may be omitted in favor of any other conventional means for causing an intimate admixture of the acid and sulphite liquor; the steam stripping may be replaced by stripping with inert gas, in which case tower 14 might be dispensed with, and the sulphur dioxide fed directly to the bottom of tower 6. It is to be understood, however, that the procedure and apparatus shown and described constitute the preferred embodiment of the present invention.

The nature and objects of the present invention having been thus described and a preferred embodiment thereof illustrated, what is claimed as new and useful and is desired to be secured by Letters Patent is:

1. A process for the production of substantially anhydrous sulphur dioxide from a sulphite waste liquor and sulphuric acid which comprises feeding said liquor to a reaction chamber, feeding concentrated sulphuric acid to the top of a packed tower and thence to said reaction chamber, causing an intimate admixture of the sulphite liquor and the sulphuric acid to take place in said reaction chamber, maintaining said reaction chamber at a temperature suitable for the reaction between concentrated sulphuric acid and a sulphite for the production of sulphur dioxide, whereby sulphur dioxide is evolved, passing the liquid reaction mixture into a separate stripping zone, passing a stripping gas through said reaction mixture in said stripping zone to strip the sulphur dioxide therefrom and passing the sulphur dioxide so recovered through said packed tower in countercurrent to the initial sulphuric acid.

2. Process for the recovery of substantially anhydrous sulphur dioxide from a waste sulphite petroleum liquor and sulphuric acid which comprises feeding said liquor to a reaction chamber, feeding concentrated sulphuric acid to the top of a packed tower and thence to said reaction chamber, causing an intimate admixture of the sulphite liquor and the sulphuric acid to take place in said reaction chamber, maintaining the reaction chamber at a temperature suitable for the reaction between sulphuric acid and a sulphite for the production of sulphur dioxide, whereby sulphur dioxide is evolved from said reaction mixture, passing the liquid reaction mixture into a separate stripping zone, passing a current of steam through said reaction mixture in said stripping zone to strip the sulphur dioxide therefrom, passing the mixture of steam and sulphur dioxide so produced through a cooling zone maintained at a temperature suitable for the condensation of the bulk of the steam and passing the resulting sulphur dioxide through said packed tower in countercurrent to the initial sulphuric acid, whereby said sulphur dioxide is rendered anhydrous.

3. An apparatus for the recovery of sulphur dioxide from sulphite liquors comprising a reaction chamber, a feed line for introducing sulphite liquor into said chamber at a point adjacent the bottom thereof, an upwardly extending baffle arranged in said chamber at a point spaced from the point of introduction of said sulphite liquor, a feed line for sulphuric acid opening into said chamber at a point between said baffle and the point of introduction of said sulphite liquor and below the level of the top of said baffle, said second feed line depending from a packed tower, means for introducing sulphuric acid into the top of said tower, a second tower, a vapor line connecting from said reaction chamber to the bottom of said second tower, a cooling coil arranged in said second tower, means for returning the condensate in said second tower to said chamber on the opposite side of said baffle from that on which feed materials enter, means for introducing steam below the surface of the liquid on the same side of said baffle on which the condensate returns, a conduit connecting the top of said second tower with the bottom of the packed tower, and an outlet for sulphur dioxide at the top of said packed tower.

KARL L. SPRINGER.